United States Patent
Kwak et al.

(10) Patent No.: US 8,503,558 B2
(45) Date of Patent: Aug. 6, 2013

(54) SIGNAL MODULATING DEVICE, SIGNAL TRANSMITTING METHOD, AND CODE GENERATING METHOD

(75) Inventors: Byung-Jae Kwak, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 774 days.

(21) Appl. No.: 12/638,328

(22) Filed: Dec. 15, 2009

(65) Prior Publication Data

US 2010/0150269 A1 Jun. 17, 2010

Related U.S. Application Data

(60) Provisional application No. 61/122,906, filed on Dec. 16, 2008.

(30) Foreign Application Priority Data

Jul. 27, 2009 (KR) .......................... 10-2009-0068533

(51) Int. Cl.
*H04L 5/12* (2006.01)

(52) U.S. Cl.
USPC ............ 375/261; 375/265; 375/298; 714/767; 714/783; 341/55; 341/63

(58) Field of Classification Search
USPC ................ 375/146, 260, 261, 269, 265, 295, 375/298; 714/752, 759, 763, 767, 769, 772, 714/777, 782, 783, 801, 802, 805; 341/50, 341/51, 55, 56, 57, 63, 65, 73
See application file for complete search history.

(56) References Cited

U.S. PATENT DOCUMENTS

| 2005/0271160 A1* | 12/2005 | Eroz et al. ..................... 375/298 |
| 2009/0052576 A1* | 2/2009 | Golitschek Edler Von Elbwart et al. ............................. 375/298 |
| 2009/0232252 A1* | 9/2009 | Kim et al. ..................... 375/298 |
| 2010/0166111 A1* | 7/2010 | Park et al. ..................... 375/298 |

FOREIGN PATENT DOCUMENTS

| KR | 10-2009-0127056 | 12/2009 |
| WO | 2009/148272 A2 | 12/2009 |

OTHER PUBLICATIONS

Byung-jae Kwak, et al., "Physical Layer Security with Yarg Code," First International Conference on Emerging Network Intelligence (EMERGING 2009), Oct. 11-16, 2009.

* cited by examiner

*Primary Examiner* — Dac Ha
(74) *Attorney, Agent, or Firm* — Staas & Halsey LLP

(57) ABSTRACT

The present invention relates to a signal modulation device, a transmission method, and a code generation method. The signal modulation device includes a code storage unit including a plurality of n-bit members and storing a code with a number n or n−1 of different bits between two neighboring members, and a mapper for mapping data on symbols according to the code.

13 Claims, 7 Drawing Sheets

FIG. 2

| 2-bit | 3-bit | 4-bit |
|---|---|---|
| 00 | 000 | 0000 |
| 11 | 111 | 1111 |
| 10 | 010 | 0010 |
| 01 | 101 | 1101 |
|  | 110 | 0110 |
|  | 001 | 1001 |
|  | 100 | 0100 |
|  | 011 | 1011 |
|  |  | 1100 |
|  |  | 0011 |
|  |  | 1110 |
|  |  | 0001 |
|  |  | 1010 |
|  |  | 0101 |
|  |  | 1000 |
|  |  | 0111 |

SIGNAL MODULATING DEVICE, SIGNAL TRANSMITTING METHOD, AND CODE GENERATING METHOD

CROSS-REFERENCE TO RELATED APPLICATION

This application claims priority to and the benefit of U.S. Application No. 61/122,906 filed in the United States Patent and Trademark Office on Dec. 16, 2008 and Korean Patent Application No. 10-2009-0068533 filed in the Korean Intellectual Property Office on Jul. 27, 2009, the entire contents of which are incorporated herein by reference.

BACKGROUND OF THE INVENTION (a) Field of the Invention

The present invention relates to a signal modulating device and a signal transmitting method.

(b) Description of the Related Art

Source data to be transmitted are encoded, modulated according to a channel characteristic of a transmission medium, and then transmitted.

Of the modulation methods, quadrature amplitude modulation (QAM) simultaneously combines and modulates the amplitude and the phase of a carrier so as to improve transmission efficiency in a frequency bandwidth. In detail, the QAM method uses a carrier configured by a sine wave and a cosine wave having the same frequency and a phase difference of 90° to amplitude modulate the in-phase and quadrature components, combine them, and transmit them.

In this instance, the signal is modulated by determining the positions of data to be arranged on a plane having the in-phase components as the horizontal axis and the quadrature component as the vertical axis (i.e., mapping), and the mapping process is usually performed by gray codes. A gray code represents a binary numeral system in which two successive values differ in only one bit.

In addition, as the wireless communication technology advances, demands for data transmission security as well as demands for high data transmission speeds have increased. Therefore, information security is to be maintained by satisfying appropriate data transmission speeds for the legitimate receivers, and maximizing information equivocation for illegal receivers who are wiretappers. For this, the required characteristic is the BER (bit error rate) performance that decreases steeply as the signal-to-noise ratio (SNR) increases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to modulate signals by using a code with a characteristic that the bit error rate is substantially increased by a decrease of the signal-to-noise ratio (SNR).

An exemplary embodiment of the present invention provides a signal modulation device including: a code storage unit including a plurality of n-bit members, and storing a code with a number n or n−1 of different bits between two neighboring members; and a mapper for mapping data on symbols according to the code.

The n and n−1 different bits between the neighboring members may be alternately repeated.

The mapper arranges the code on a constellation with the in-phase component as one axis and the quadrature as another axis, and the constellation may be a constellation of the $2^n$ quadrature amplitude modulation (QAM).

The mapper may divide the code into a plurality of segments including $2^{n/2}$ members, and arranges them on the constellation.

The number of different bits between two members neighboring in the row direction and the column direction may be n or n−1 in the constellation.

The plurality of segments of the code may be alternately arranged from top to bottom and from bottom to top according to the columns of the constellation.

The plurality of segments of the code may be alternately arranged from left to right and from right to left according to the rows of the constellation.

Another embodiment of the present invention provides a method for transmitting a signal of a communication system, including: 1) arranging a code including a plurality of n-bit members on a constellation, the number of different bits between two neighboring members being n or n−1; 2) modulating data by mapping the data on the symbols of the constellation; and 3) transmitting the modulated data.

When the number of different bits between a first member and a second member that is neighboring with the first member in one direction from among a plurality of members is n, the number of different bits between the first member and a third member that is neighboring with the first member in another direction may be n−1.

The constellation may be a $2^n$-QAM constellation with the in-phase component as one axis and the quadrature component as another axis.

The modulation may include dividing the code into a plurality of segments including $2^{n/2}$ members and arranging then on the constellation.

The arranging on the constellation includes, after arrangement on the constellation, arranging so that the number of different bits between two members neighboring in the row direction and between two members neighboring in the column direction may be n or n−1.

Yet another embodiment of the present invention provides a method for generating a code used for a transmitting device in a communication system to modulate transmission data, including: generating a code in the i-th stage; repeatedly generating a code in the i-th stage while increasing i from 2 to n; and generating the code in the n-th stage. The generation of a code in the i-th stage includes: generating a code in the (i−1)-th stage including $2^{i-1}$ members that are arranged in one direction; generating a mirror image of the code in the (i−1)-th stage; arranging the code in the (i−1)-th stage and the mirror image of the code in the (i−1)-th stage in the one direction; alternately inserting 0 and 1 at a predetermined position of the respective members of the code in the (i−1)-th stage and the mirror image of the code in the (i−1)-th stage that are arranged in the one direction; and generating the code in i-th stage by bit flipping either the members corresponding to the code in the (i−1)-th stage or the members corresponding to the mirror image of the code in the (i−1)-th stage into which 0 and 1 are inserted.

According to an embodiment of the present invention, information security against illegal receivers can be maintained by modulating the signals according to the codes with the characteristic in which the bit error rate decreases steeply as the signal-to-noise ratio increases.

BRIEF DESCRIPTION OF THE DRAWINGS

FIG. 2 shows examples of code used by a transmitting device according to an exemplary embodiment of the present invention.

DETAILED DESCRIPTION OF THE EMBODIMENTS

Figure 1:
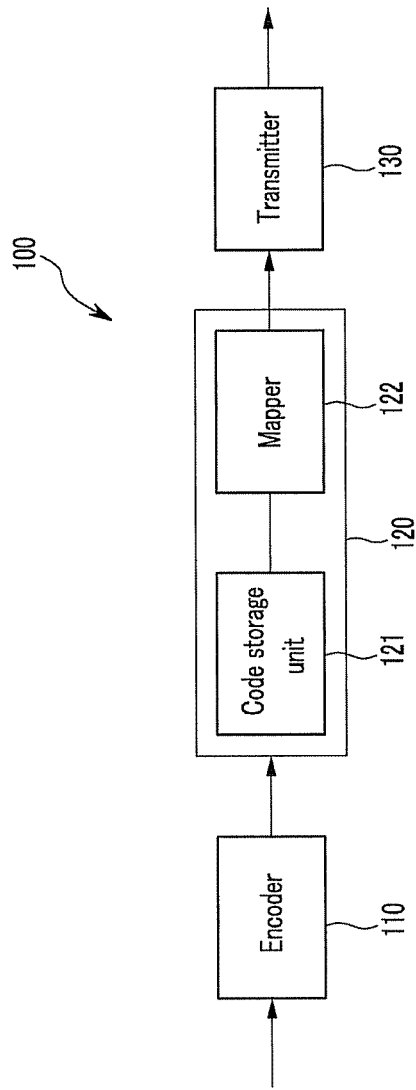
FIG. 1 shows a block diagram of a transmitting device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

A transmitting device and signal modulation method according to an exemplary embodiment of the present invention will now be described with reference to accompanying drawings.

FIG. 1 shows a block diagram of a transmitting device according to an exemplary embodiment of the present invention.

Referring to FIG. 1 the transmitting device 100 includes an encoder 110, a modulator 120, and a transmitter 130.

The encoder 110 performs source encoding of the source data followed by channel encoding.

The modulator 120 modulates the encoded data, and includes a code storage unit 121 and a mapper 122.

The code storage unit 121 stores codes representing a method for mapping the encoded data on the symbols according to a predetermined rule.

The mapper 122 allocates the code members stored in the code storage unit 121 on the symbols of the constellation having the in-phase components on the horizontal axis and the quadrature component on the vertical axis, and maps the encoded data on the symbols of the constellation, thereby modulating the data. In this case, some bits of the members correspond to the in-phase components, and some remaining bits correspond to the quadrature components.

The transmitter 130 transmits the modulated data to a receiving device.

The codes used by the transmitting device according to an exemplary embodiment of the present invention will now be described with reference to FIG. 2 and FIG. 3.

FIG. 2 shows examples of codes used by a transmitting device according to an exemplary embodiment of the present invention.

Referring to FIG. 2, the codes used by the transmitting device according to an exemplary embodiment of the present invention are configured by a plurality of n-bit numbers (hereinafter, code members) listed in a sequence, and the lists are arranged so that the number of bits between two successive members may be the greatest. That is, in the case of n bits, the number of different bits between two successive members is n or n−1, and all members are arranged so that n and n−1 different bits are alternately repeated. For example, in the case of 2 bits, the number of different bits between two successive members is 2 or 1, in the case of 3 bits, the number of different bits between two successive members is or 2, and in the case of 4 bits, the number of different bits between two successive members is 4 or 3. When n-bit members are used, the code is formed as a sequence of $2^n$ members.

Also, the above-noted rule is maintained between the last member and the first member of the sequence. For example, in the case of 4 bits, the first member is 0000 and the last member is 0111, and the number of different bits between the first and the last members is 3.

The code is designed to have the maximum bit error per symbol error. Therefore, as the signal-to-noise ratio (SNR) is reduced, the bit error rate (BER) is steeply increased. Accordingly, the information security is maintained against an illegal receiver who tries to listen to the data.

A method for generating the above-described code will be described with reference to FIG. 3.

Figure 3:
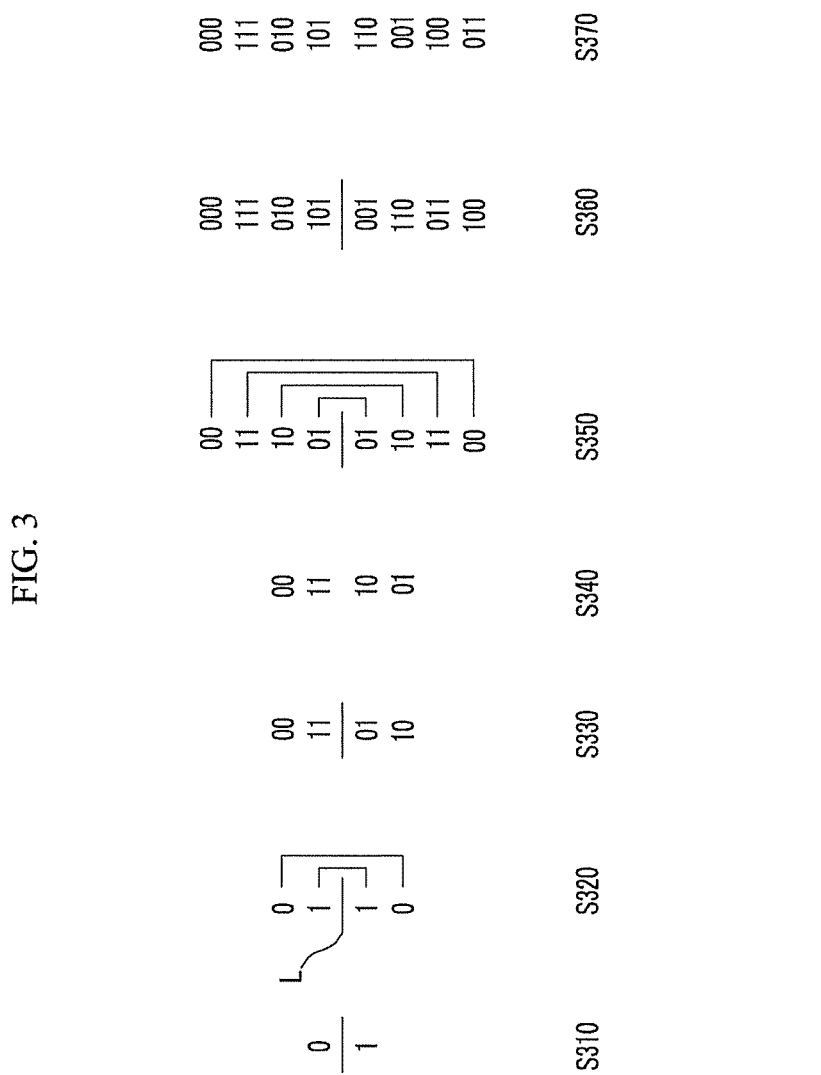
FIG. 3 shows an example of method for generating a code used by a transmitting device according to an exemplary embodiment of the present invention.

FIG. 3 shows a method for generating a code used by a transmitting device according to an exemplary embodiment of the present invention.

Referring to FIG. 3, the 1-bit number sequence {0, 1} is sequentially arranged from top to bottom (S310). In this instance, the number of different bits between the 1-bit number sequence {0, 1} is 1, which is the maximum number allowable for the 1-bit number. Therefore, the number sequence {0, 1} corresponds to the 1-bit code from among the codes that are used for the transmitting device according to an exemplary embodiment of the present invention, and 0 and 1 are members for configuring the 1-bit code.

Then, the arranged member {0, 1} is arranged symmetrically from top to bottom with respect to the central line L (S320). That is, {0, 1, 1, 0} is sequentially arranged from top to bottom.

The numbers 0 and 1 are sequentially and alternately added before the arranged number sequence {0, 1, 1, 0} (S330) to generate the number sequence {00, 11, 01, 10}.

After that, the bits that are arranged below the central line L from among the number sequence {00, 11, 01, 10} are converted into the opposite bits (S340), which is called bit flipping, to generate the number sequence {00, 11, 10, 01}. In the number sequence, the first number 00 and the second number 11 have two different bits, the second number 11 and the third number 10 have one different bit, and the third number 10 and the fourth number 01 have two different bits.

Therefore, the number of different bits between the successive numbers becomes the maximum. That is, the number sequence {00, 11, 10, 01} corresponds to the code including 2-bit members from among the codes used for the transmitting device according to an exemplary embodiment of the present invention shown in FIG. 2.

The members of {00, 11, 10, 01} are arranged symmetrically with respect to the central line L (S350) that is, like {00, 11, 10, 01, 01, 10, 11, 00}.

The numbers 0 and 1 are sequentially and alternately added before respective members of the arranged number sequence {00, 11, 10, 01, 01, 10, 11, 00} (S360) to generate the number sequence {000, 111, 010, 101, 001, 110, 011, 100}.

The bits of the numbers that are arranged below the central line L from among the number sequence {000, 111, 010, 101, 001, 110, 011, 100} are converted into opposite bits (S370) to generate the number sequence {000, 111, 010, 101, 110, 001, 100, 011}. In the number sequence, the first number 000 and the second number 111 have 3 different bits, and the second number 111 and the third number 010 have 2 different bits. The number of different bits between successive numbers is 3 or 2. Therefore, the number of different bits between the successive numbers becomes the maximum. That is, the number sequence {000, 111, 010, 101, 110, 001, 100, 011} corresponds to the code configured with a 3-bit member from among the codes used for the transmitting device according to an exemplary embodiment of the present invention shown in FIG. 2.

According to the above-noted method, the code configured with the 4-bit member from among the codes used for the transmitting device according to an exemplary embodiment of the present invention shown in FIG. 2 can be generated. In addition, according to the present invention, the code configured with the n-bit member can be generated.

In FIG. 3, code generation is started by sequentially arranging {0, 1} in the first stage S310, and the code generation can also be started with {1, 0}.

Further, the numbers 0 and 1 are sequentially and alternately added in the third stage S320, and on the contrary, the numbers 1 and 0 can be sequentially and alternately added. In addition, the number 0 or 1 is alternately added in front of each member of the arranged number sequence {0, 1, 0, 1} in the second stage S320, but alternatively the same can be added at the end of each member of the number sequence {0, 1, 0, 1}, and when the arranged sequence has a plurality of columns, for example when it has two columns as shown in S350, the number 0 or 1 can be alternately added between two columns.

Also, the bits of the members below the central line are switched into opposite ones in the fourth stage S340, but, alternatively it is possible to change the bits of the members above the central line.

A mapping method by a transmitting device according to an exemplary embodiment of the present invention will now be described with reference to FIG. 4 to FIG. 7.

Figure 4:
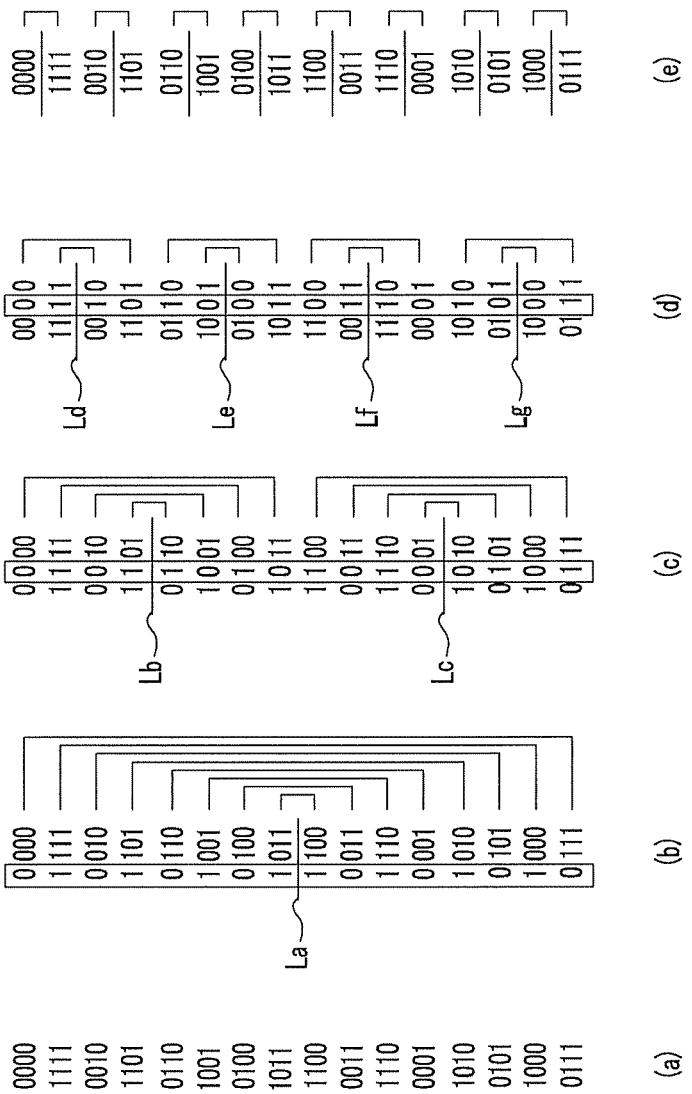
FIG. 4 shows a description of the characteristic of a code used by a transmitting device according to an exemplary embodiment of the present invention.
Figure 5:
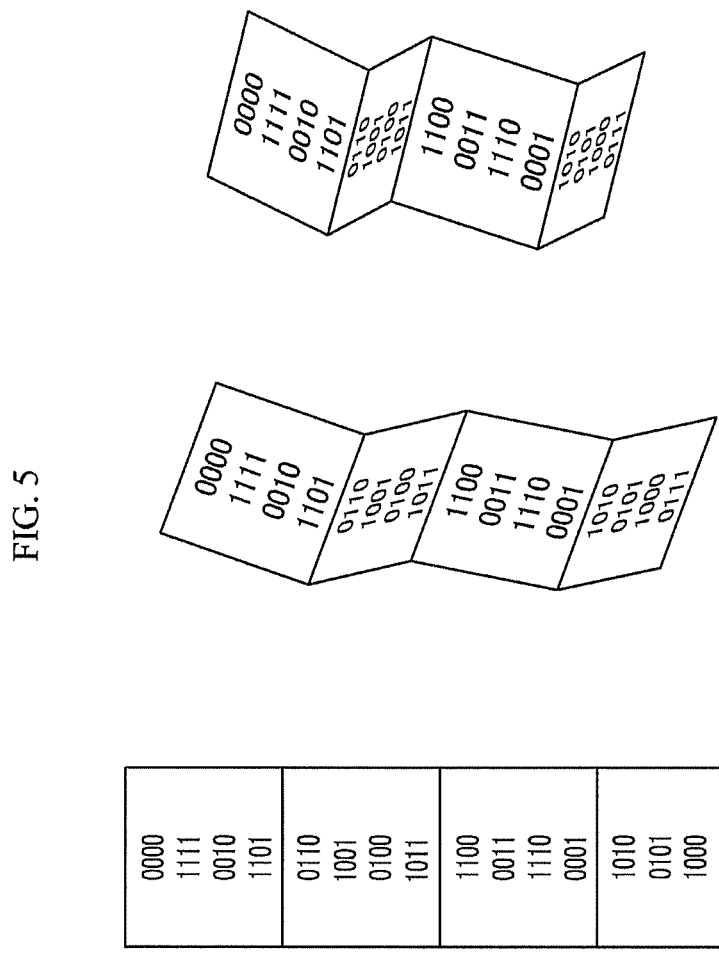
FIG. 5 shows another description of the characteristic of a code used by a transmitting device according to an exemplary embodiment of the present invention.
Figure 6:
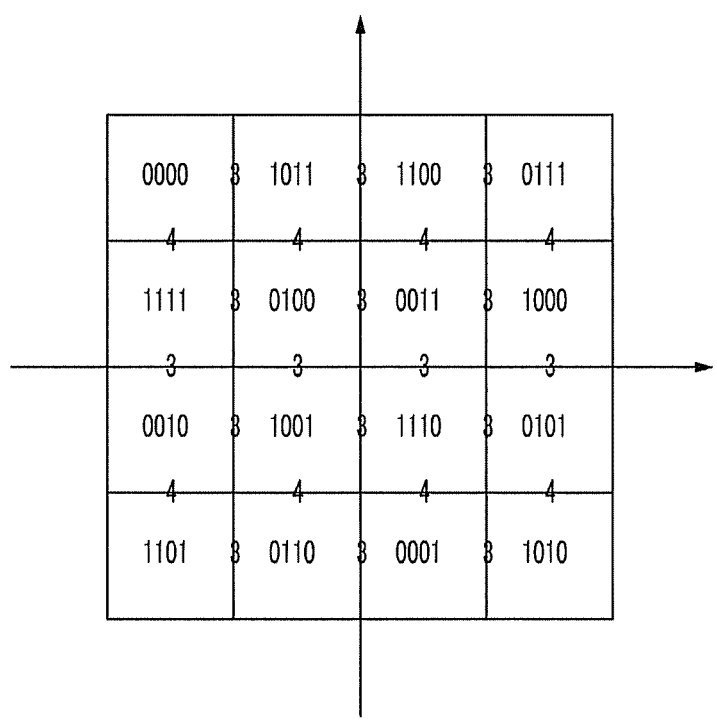
FIG. 6 shows an example of the constellation for describing a mapping method by a transmitting device according to an exemplary embodiment of the present invention.
Figure 7:
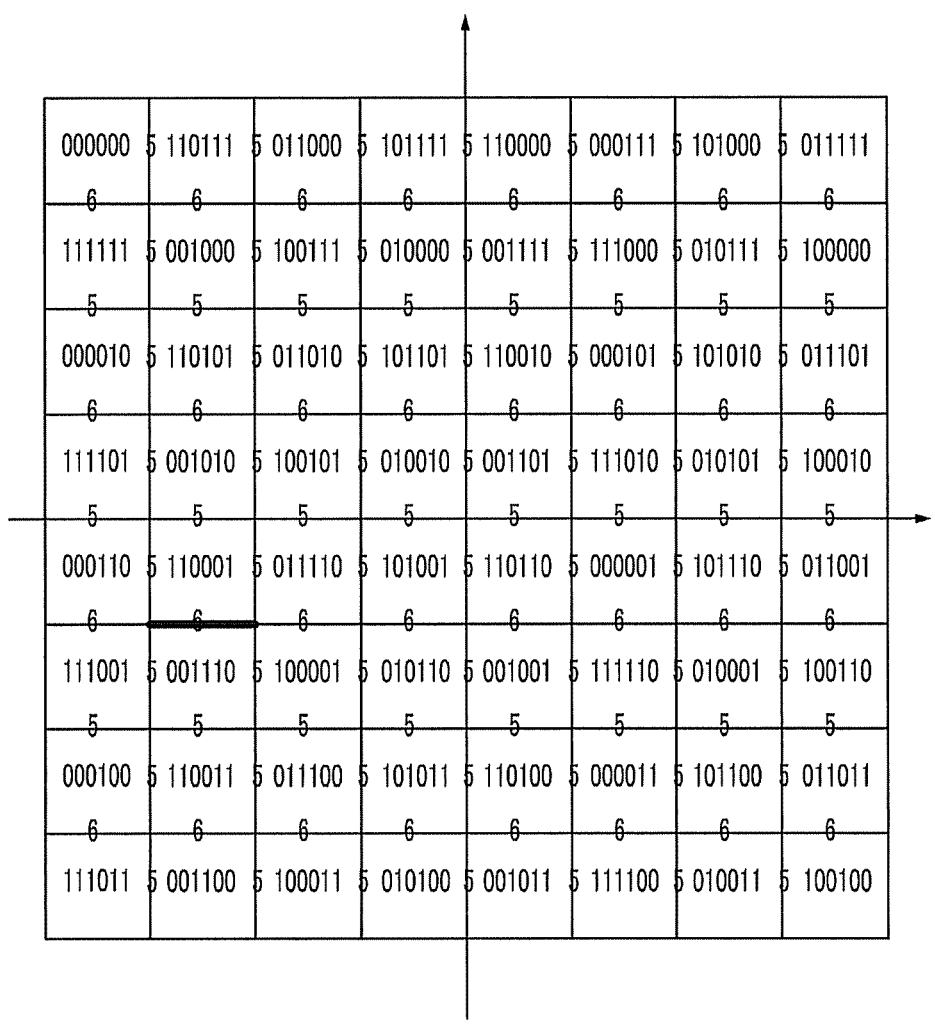
FIG. 7 shows an example of the constellation for describing a mapping method by a transmitting device according to another exemplary embodiment of the present invention.

FIG. 4 and FIG. 5 show descriptions of characteristics of a code used by a transmitting device according to an exemplary embodiment of the present invention, FIG. 6 shows a constellation for describing a mapping method by a transmitting device according to an exemplary embodiment of the present invention, and FIG. 7 shows a constellation for describing a mapping method by a transmitting device according to another exemplary embodiment of the present invention.

FIG. 4 shows an example (a) of a 4-bit code from among the codes used by a transmitting device according to an exemplary embodiment of the present invention. According to the above-described code generation method, the columns other than the column represented in a quadrangle are antisymmetric with respect to a first central line La as shown in (b). That is, the bits of the two members that are symmetric with respect to the central line La are opposite. Referring to (c), the columns except the column displayed in the quadrangle from among the members above the first central line La are antisymmetric with respect to the second central line Lb, and the columns except the column displayed in the quadrangle from among the members below the first central line La are antisymmetric with respect to the third central line Lc. Referring to (d), the columns except the column displayed in the quadrangle from among the members above the second central line Lb are antisymmetric with respect to the fourth central line Ld, and the columns except the column displayed in the quadrangle from among the members below the second central line Lb are antisymmetric with respect to the fifth central line Le, and such antisymmetric relationship is repeated with respect to the sixth and seventh central lines Lf and Lg. Also, as displayed in (e), the 4 bits of the two successive members are antisymmetric.

When the 4-bit code is written on a long paper tape as shown in FIG. 5, and the paper is folded so that each segment of the paper forms a segment containing four of the 4 bit members, any two members facing each other or any two members facing away from each other are binary numbers different in all bit locations except one because of the code characteristic described with reference to FIG. 4.

When the four segments of the 4-bit code strip is arranged on the four corresponding columns of the constellation of 16-QAM as shown in FIG. 6, 16-QAM mapping is completed. In FIG. 6, the four 4-bit members in the first column of the constellation are from the first segment of the folded strip of the code in FIG. 5, and the four members on the first segment of the strip are arranged from top to bottom of the first column of the constellation, the four 4-bit members in the second column of the constellation are from the second segment of the folded strip of the code in FIG. 5, and the four members on the second segment of the strip are arranged from bottom to top of the second column of the constellation, the four 4-bit members in the third column of the constellation from the third segment of the folded strip of the code in FIG. 5, and the four members on the third segment of the strip are arranged from top to bottom of the third column of the constellation, and four 4-bit members in the fourth column of the constellation are from the fourth segment of the folded strip of the code in FIG. 5, and the four members on the fourth segment of the strip are arranged from bottom to top of the fourth column of the constellation. In the completed constellation, the number of different bits between two vertically or laterally neighboring members are the maximum possible numbers. That is, the number of different bits between two vertically or laterally neighboring members is either 3 or 4.

FIG. 6 shows an example of mapping the segments of a 4-bit code on the 16-QAM constellation beginning from the column on the left-hand side. However, the mapping can be performed beginning from the column on the right-hand side of the constellation. Also, when each segment of the strip is mapped to their corresponding column, the members in each segment are mapped to the symbols of the corresponding column either from top to bottom or from bottom to top. This mapping direction can be reversed by mapping from bottom to top instead of top to bottom, and from top to bottom instead of bottom to top. Also, the segments of the strip of the code can be mapped to the rows of the 16-QAM constellation instead of the columns. And the mapping can begin from the first row of the constellation, and it can begin from the last row of the constellation. When the segments of the strip of the code is mapped to the rows instead of columns of the constellation, it is the same as mapping the segments to the columns of the constellation, followed by rotation of the constellation by 90 degrees in the clockwise direction or counter clockwise direction.

Referring to FIG. 7, it is possible to generate a 6-bit code so that the number of different bits between two successive members is 6 or 5, divide it into 8 segments, and arrange them on the 64-QAM constellation according to the above-described method of the present invention in order to maximize the number of different bits between two vertically or laterally neighboring members. Then, the number of different bits between two vertically or laterally neighboring members in the 64-QAM constellation becomes 6 or 5.

The code including n-bit members can be divided into a plurality of segments including $2^{n/2}$ members to be arranged on the $2^n$-QAM constellation.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A signal modulation device comprising:
   a code storage unit comprising a plurality of n-bit members, and storing a code having a number n or n−1 of different bits between two neighboring members; and
   a mapper for mapping data on symbols according to the code,
   wherein n is an integer.

2. The signal modulation device of claim 1, wherein the n or n−1 of different bits between two neighboring members are alternately repeated.

3. The signal modulation device of claim 1, wherein the mapper arranges the code on a constellation with the in-phase component as one axis and the quadrature as another axis, and
   the constellation is a constellation of the $2^n$ quadrature amplitude modulation (QAM).

4. The signal modulation device of claim 3, wherein the mapper divides the code into a plurality of segments including $2^{n/2}$ members, and arranges them on the constellation.

5. The signal modulation device of claim 4, wherein the number of different bits between two members neighboring in the row direction and the column direction is n or n−1 in the constellation.

6. The signal modulation device of claim 5, wherein the plurality of segments are alternately arranged from top to bottom and from bottom to top according to the sequence of the constellation.

7. The signal modulation device of claim 5, wherein the plurality of segments are alternately arranged from left to right and from right to left according to the row of the constellation.

8. A method for transmitting a signal of a communication system, comprising:
   arranging a code comprising a plurality of n-bit members on a constellation, a number of different bits between two neighboring members being n or n−1;
   modulating data by mapping the data on symbols of the constellation; and
   transmitting the modulated data
   wherein n is an integer.

9. The method of claim 8, wherein
   when the number of different bits between a first member and a second member that is neighboring with the first member in one direction from among a plurality of members is n, the number of different bits between the first member and a third member that is neighboring with the first member in another direction is n−1.

10. The method of claim 8, wherein
    the constellation is a $2^n$-QAM constellation with the in-phase component as one axis and the quadrature component as another axis.

11. The method of claim 10, wherein
    the modulating comprises dividing the code into a plurality of segments including $2^{n/2}$ members and arranging then on the constellation.

12. The method of claim 11, wherein
    the arranging on the constellation comprises, after arrangement on the constellation, arranging so that the number of different bits between two members neighboring in the row direction and between two members neighboring in the column direction may be n or n−1.

13. A method for generating a code used for a transmitting device in a communication system to modulate transmission data, comprising:
    generating a code in a i-th stage;
    repeatedly generating a code in the i-th stage while increasing i from 2 to n; and
    generating the code in a n-th stage, wherein
    the generating the code in the i-th stage comprises:
    generating a code in the (i−1)-th stage comprising $2^{i-1}$ members that are arranged in one direction;
    generating a mirror image of the code in the (i−1)-th stage;
    arranging the code in the (i−1)-th stage and the mirror image of the code in the (i−1)-th stage in the one direction;
    alternately inserting 0 and 1 at a predetermined position of the respective members of the code in the (i−1)-th stage and mirror image of the code in the (i−1)-th stage that are arranged in the one direction; and
    generating the code in i-th stage by bit flipping either the members corresponding to the code in the (i−1)-th stage or the members corresponding to the mirror image of the code in the (i−1)-th stage into which 0 and 1 are inserted,
    wherein n is an integer.

* * * * *